E. HAYCOX.
Grate-Bar.

No. 225,521.   Patented Mar. 16, 1880.

Witnesses:
P. C. Dietrich
N. W. Bright

Inventor
Edward Haycox.
Per W. W. Leggett. Attorneys.

UNITED STATES PATENT OFFICE.

EDWARD HAYCOX, OF DETROIT, MICHIGAN.

GRATE-BAR.

SPECIFICATION forming part of Letters Patent No. 225,521, dated March 16, 1880.

Application filed November 24, 1879.

*To all whom it may concern:*

Be it known that I, EDWARD HAYCOX, of Detroit, county of Wayne, State of Michigan, have invented a new and useful Improvement in Grate-Bars; and I declare the following to be a full, clear, and exact description of the same, such as will enable others skilled in the art to which it pertains to make and use it, reference being had to the accompanying drawings, which form a part of this specification.

My invention consists in the combination of devices and appliances hereinafter specified, and pointed out in the claims.

Figure 1:
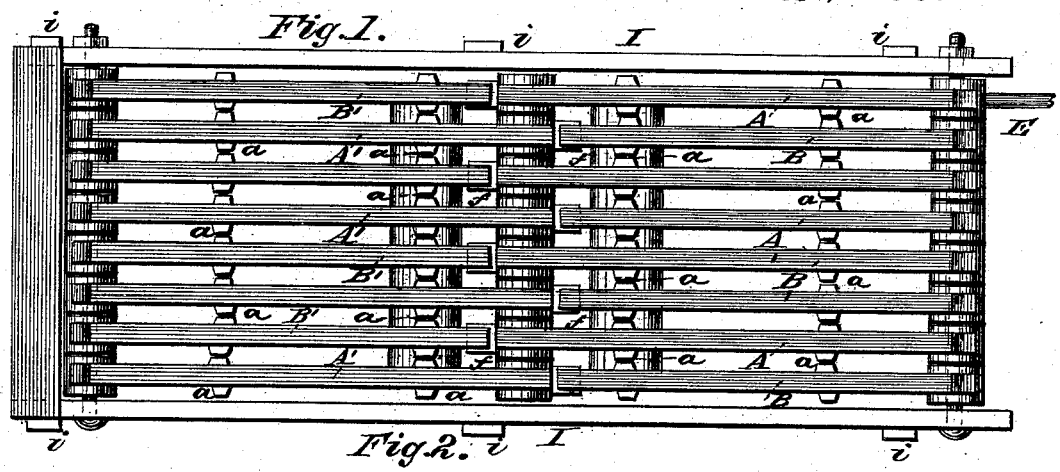
Figure 2:
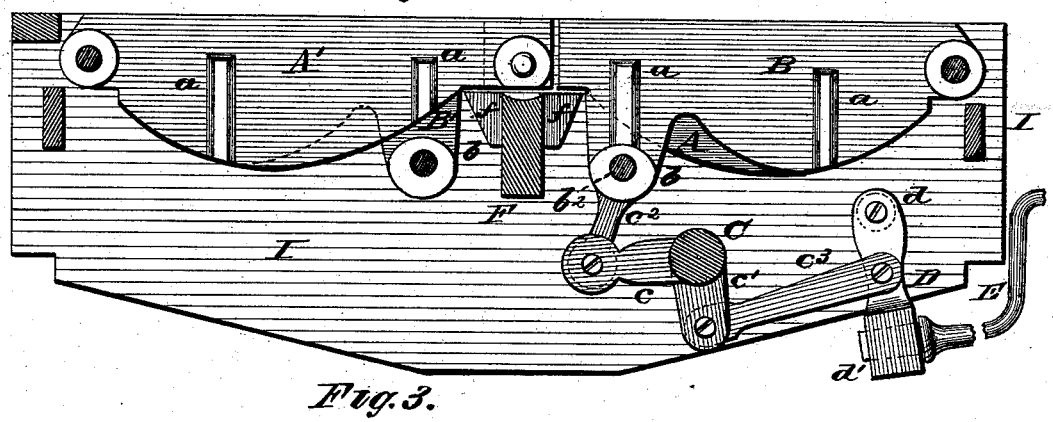
Figure 3:
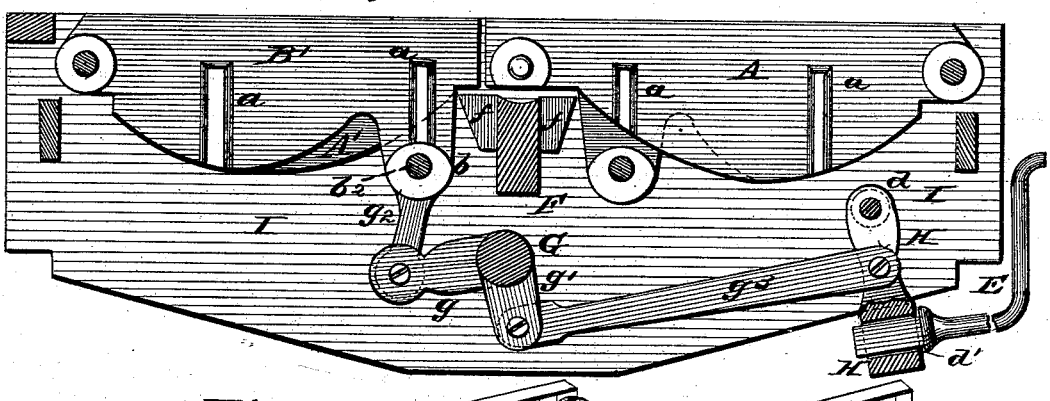
Figure 4:
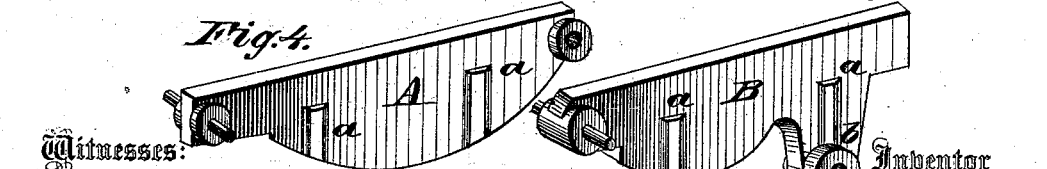

In the drawings, Figure 1 is a plan view of a grate embodying my invention. Fig. 2 is a longitudinal sectional view, illustrating how the front set of bars are operated. Fig. 3 is a longitudinal section, illustrating how the rear set of bars are operated. Fig. 4 is a separate view of a stationary and a movable bar.

A represents alternate grate-bars, which are fastened rigidly at each end, so as to form permanent bars. B are bars alternating with the permanent bars A. The bars B are suitably pivoted at their forward ends, and at their rear ends a projection extends downward from each bar, and beneath is a suitable cross-head, $b$, or other contrivance, whereby the rear ends may all be united by a rod or other device, $b^2$, so as to move together.

C is a rock-shaft located beneath the grate, and from which project the arms $c$ $c'$. The arm $c$ is, by a suitable connecting bar or bars, $c^2$, united with the rod $b^2$, and the arm $c'$ is, by a rod or bar, $c^3$, attached to the swinging lever D. The lever D is pivoted at $d$, and has at its free end a cavity, $d'$, for the insertion of the shaking-bar E.

The operation of this part of the mechanism is as follows: When it is desired to shake the grate the bar E is inserted in the cavity $d'$, and by forcing the bar E downward the rod $c^3$, through the arm $c'$, rocks the shaft C, which causes the arm $c$ to lift on connecting-bars $c^2$, thereby lifting the free ends of the bars B about their forward pivoted ends, thus agitating the superincumbent fuel and causing the ashes to fall through.

In order to prevent the rear ends of the bars B from falling down, a supporting cross-piece, F, is provided, and upon it are cast lugs $f$, which sustain the rear ends of the bars B. The cross-piece may also serve to sustain the rear ends of the stationary bars A, if desired.

A' and B' represent a similar rear series of stationary and movable bars. The movable bars B' are suitably hinged or pivoted at their rear ends to the stationary bars, but at their forward ends are provided with projections extending beneath the grate, where their cross-heads $b$ are united by a rod, $b^2$, so as to move together. They are provided with shaking mechanism similar to the front bars, G being the rock-shaft, with arms $g$ $g'$, connecting-rods $g^2$ $g^3$, and a pendent lever, H, in front, adjacent or accessible to the fireman, and is shaken in like manner.

There may be placed side by side several sections of grate-bars like that shown in the drawings, in which case I would make the side supporting-plates, I, of sufficient breadth to sustain the grates, and cast shallow ribs $i$ upon them to hold them apart about the breadth of the grate-bar spaces.

In order to sustain the grate-bars themselves against warping out of shape, I cast ribs $a$ upon them, which bear against corresponding ribs on the adjacent bars.

As heretofore stated, the grate-bars may be united by rods at their pivoted ends, and so may the stationary bars have both their ends united with the adjacent grate-bars by rods; but I prefer generally to make one bar in the form shown at A and the other as shown at B in Fig. 4, so that a trunnion projecting from one shall enter a corresponding seat in the other, so that if any bar is injured it may be removed without practically disturbing the others, and the expense of manufacture be at the same time reduced and the structure simplified.

This grate is designed more especially as a boiler-grate for large boilers, such as marine boilers, &c.

The bars B and B' being hinged at one end, rather than at a point between the ends, makes a stable bed for the coals, and is not liable to choke in shaking.

What I claim is—

1. In a grate, the combination, with the stationary bars A and bars B alternating there-with, the latter journaled at one end upon a cross bar or rod to which the stationary bars are secured, and provided with downward projections having bearings formed therein, of the rod $b^2$, connecting the several pivoted or hinged bars and located below the stationary bars, and suitable lever mechanism for raising and lowering the free ends of the movable bars B, substantially as set forth.

2. A grate-bar consisting of two series, each of which is provided with a series of stationary and a series of movable bars, the latter alternating with the former, the adjacent ends of the stationary bars being journaled upon a single cross-bar, while the movable bars are each constructed with downward projections having bearings formed therein, and each series connected by independent cross bars or rods, together with independent rock-shafts and connecting-rods for imparting movement independently to the two series of movable bars, substantially as set forth.

3. The combination, in a grate, of bars A and movable bars B, and, in connection with the movable bars, the rock-shaft C, arms $c$ $c'$, connecting-rods $c^2$ $c^3$, and swinging lever D, substantially as and for the purposes described.

4. In a grate having the alternate bars stationary and the others movable, the combination, with the movable bars, of cross-heads beneath the free ends, of such dimensions that they may be united beneath the stationary bars and leave room for the play of the bars in shaking, substantially as set forth and shown.

In testimony whereof I sign this specification in the presence of two witnesses.

EDWARD HAYCOX.

Witnesses:
WM. M. PORTER,
W. C. BELLOWS.